March 29, 1927.

J. P. VOGEL 1,622,984

WEIGH PAN

Filed Nov. 10, 1921  3 Sheets-Sheet 2

INVENTOR
J. Pierre Vogel,
his attys

March 29, 1927.

J. P. VOGEL

WEIGH PAN

Filed Nov. 10, 1921   3 Sheets-Sheet 3

1,622,984

INVENTOR

Patented Mar. 29, 1927.

1,622,984

UNITED STATES PATENT OFFICE.

JOSEPH PIERRE VOGEL, OF PITTSBURGH, PENNSYLVANIA, ASSIGNOR TO HEYL & PATTERSON, INC., OF PITTSBURGH, PENNSYLVANIA, A CORPORATION OF PENNSYLVANIA.

WEIGH PAN.

Application filed November 10, 1921. Serial No. 514,192.

The present invention relates broadly to weighing apparatus, and more particularly to apparatus of this type generally referred to as weigh pans for use at mines and tipples for weighing coal and similar material, although it will be understood that the utility of the invention is not limited in this respect.

It has heretofore been customary to either weigh coal by the use of a weigh pan comprising separable or relatively movable sections, or by weighing directly in the cars. Both of these methods are open to several objections.

Where weigh pans are used which comprise relatively movable pan sections or gates, the angle of inclination of such sections or gates, when opened after the coal is weighed, is ordinarily not sufficient to cause all of the wet coal or the fine coal to be discharged. This results in repeated reweighing of certain portions of the coal whereby the miners are paid for more coal than is actually mined. On the other hand, the inclination of the sections or gates when in closed position is not sufficient to cause all of the coal to slide into the apparatus. This means that certain portions of the coal are not weighed at all, and the miners are consequently underpaid. In like manner, the sections or gates often do not close tightly, and a considerable portion of fine coal sifts through the joint before the weighing is completed.

A further disadvantage of such weigh pans arises from the fact that a short car will not overcome the counterweights attached to the pan sections. This makes it necessary to add additional coal sufficient to overcome the action of such counterweights, and then estimate what portion of the total amount should be credited to each particular miner.

Weighing in cars has proven unsatisfactory for some time both to the miners and the mine owners. This is true for the reason that cars vary considerably in weight thereby making accurate determination of the weight of the mined coal extremely difficult.

The present invention overcomes these objections by providing a weigh pan which will receive and weigh any desired amount of coal, which will prevent sifting and sticking, and which may be operated to discharge its contents at will.

The foregoing and other objects of the present invention together with their attendant advantages will be apparent as the invention becomes better understood by reference to the accompanying specification and drawings forming a part thereof, it being premised that changes may be made in the details of construction and manner of operation without departing from the scope of my invention or my broader claims.

In the drawings:

Figure 4 is a perspective view of one set of scale levers.

Figure 1:
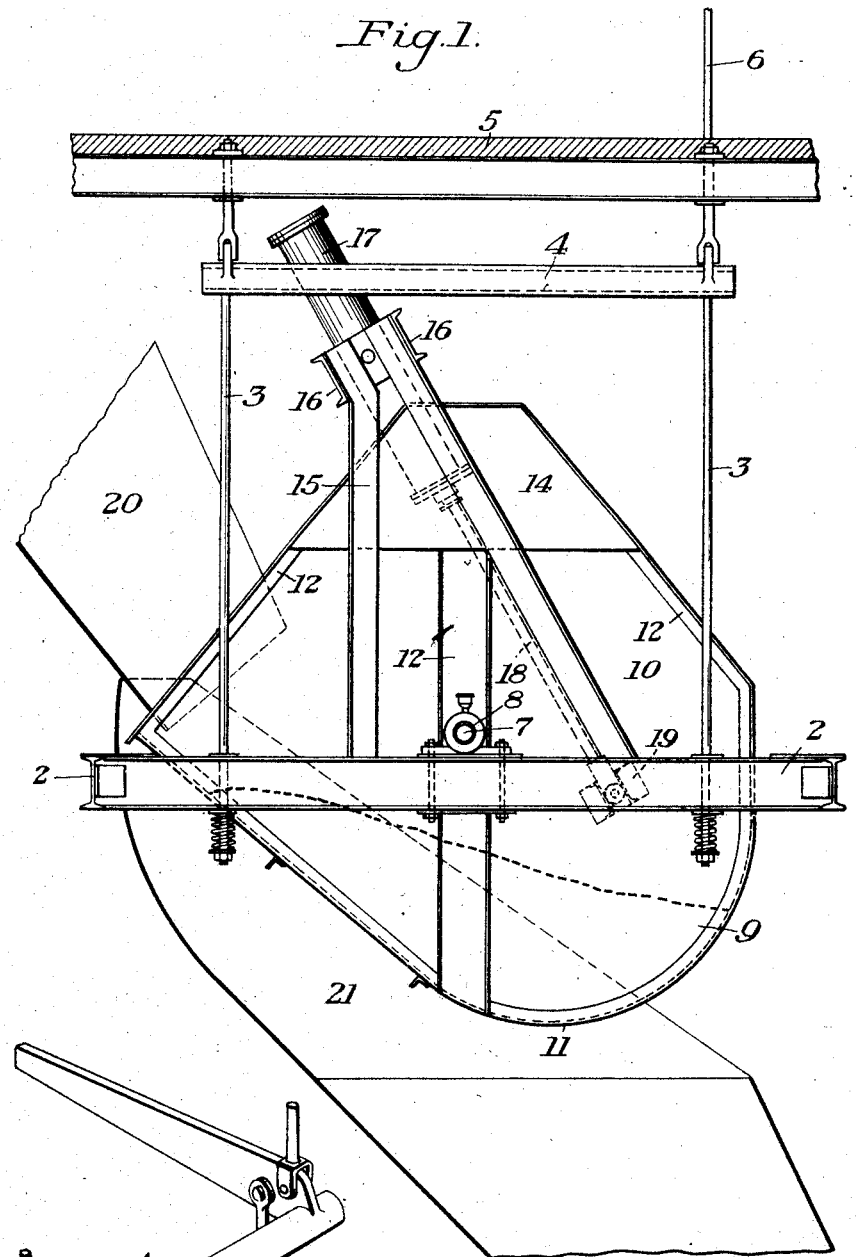
Figure 1 is an end elevation of an apparatus embodying the present invention illustrating the weigh pan in normal position.

As shown in the drawings, the present invention may comprise a supporting frame 2 of any desired construction suspended by links 3 from scale levers 4 pivotally connected in any desired manner to an operating platform 5. The scale levers 4 in turn cooperate with a tension member 6 leading to any standard type of scale beam or pulley, not shown.

Supported by the frame 2 is a shaft 7 mounted in suitable bearings 8 on the frame and carrying a weigh pan 9. This weigh pan preferably comprises side plates 10 suitably connected to a curved bottom member 11 adapted to receive the coal or other material being weighed. The entire structure may be suitably reinforced by angle irons or channel irons 12, and the sides 10 are preferably maintained in definitely spaced relationship by a transversely extending brace 13. Each of the sides, above the shaft 7, has secured thereto in any desired manner a counterweight 14 adapted to facilitate discharging the weigh pan as will be more fully pointed out hereinafter.

Extending upwardly from the frame 2 adjacent the bearings 8 are supports 15 connected at their upper ends by channel beams 16. Mounted for free pivotal movement between the channel beams 16 is a fluid pressure operating cylinder 17 having a piston 18 which is secured between bars 19 extending the length of the weigh pan and pivotally connected in each of the sides 10. By reason of this construction, it will be apparent, that when air, or other operating fluid, is admitted to the lower end of the cylinder 17, the piston 18 will be drawn upwardly. This will rock the entire weigh pan in the bearings 8 from the position shown in Fig. 1 to the position shown in Fig. 2. By reason of the pivotal mounting of the actuating cylinder and its piston, it will be apparent that such movement is permitted.

Cooperating with the weigh pan is a delivery chute 20 adapted to supply thereto the material to be weighed. Normally, this material will assume a position substantially as indicated in dotted lines in Fig. 1. The inclination of the delivery chute and the curved bottom of the weigh pan at its receiving side is such that all of the material supplied to the chute is fed into the weigh pan. The construction of the weigh pan prevents such material from sifting therethrough. After the desired amount of material has been fed into the weigh pan, the amount may be measured accurately by inspection of the scales connected with the tension member 6. The amount of material having been determined, the weigh pan will be operated, as described, the counterweights 14 after their passage over the center line of the shaft 7 assisting the cylinder 17. Extending upwardly around the receiving end of the weigh pan and the lower end of the chute 20 is a discharge chute 21. When the weigh pan is moved to its discharging position, the inclination of its sides and bottom is such that all of the coal, or other material, is discharged therefrom. Thereafter actuating fluid may be admitted to the opposite end of the cylinder 17 for returning the weigh pan to its normal position.

Figure 2:
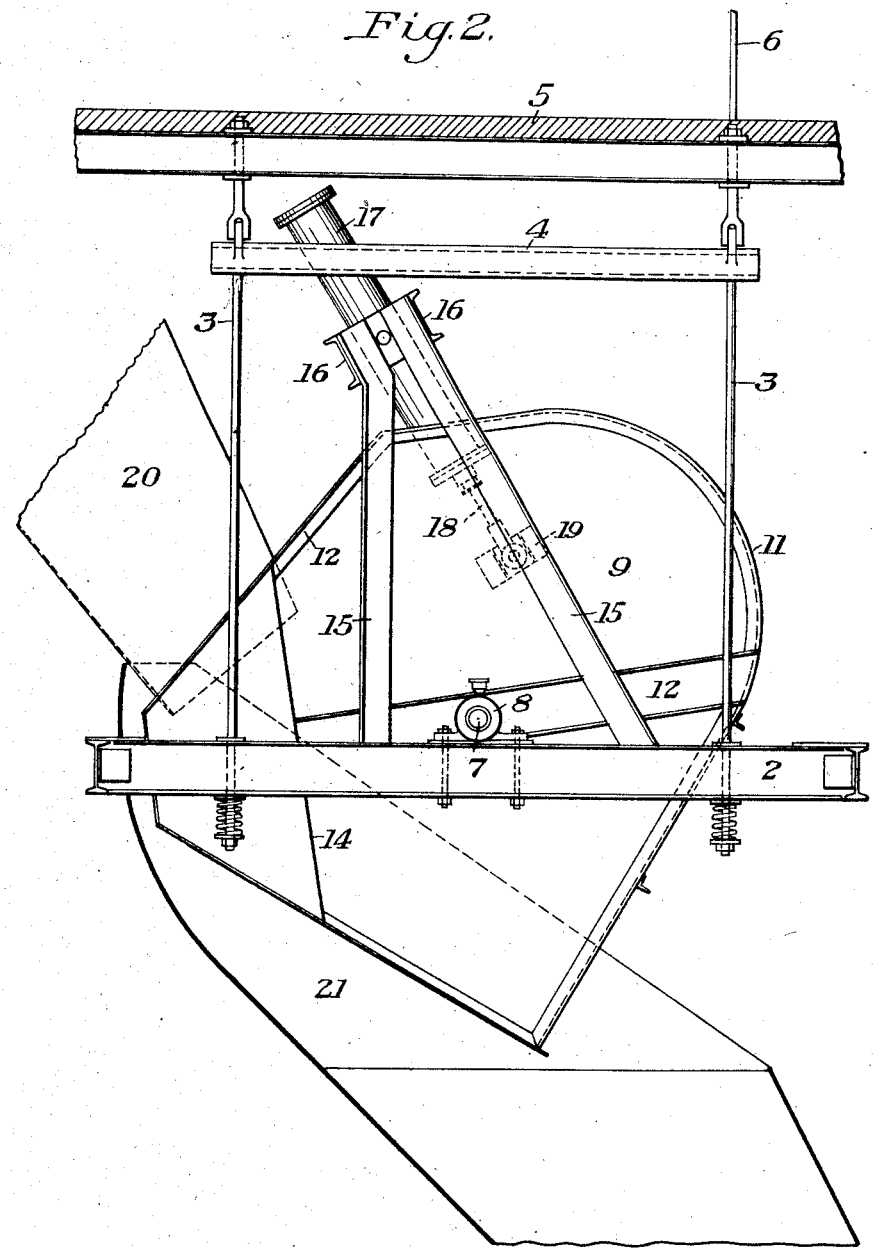
Figure 2 is a view corresponding to Figure 1, illustrating the weigh pan in discharging position.
Figure 3:
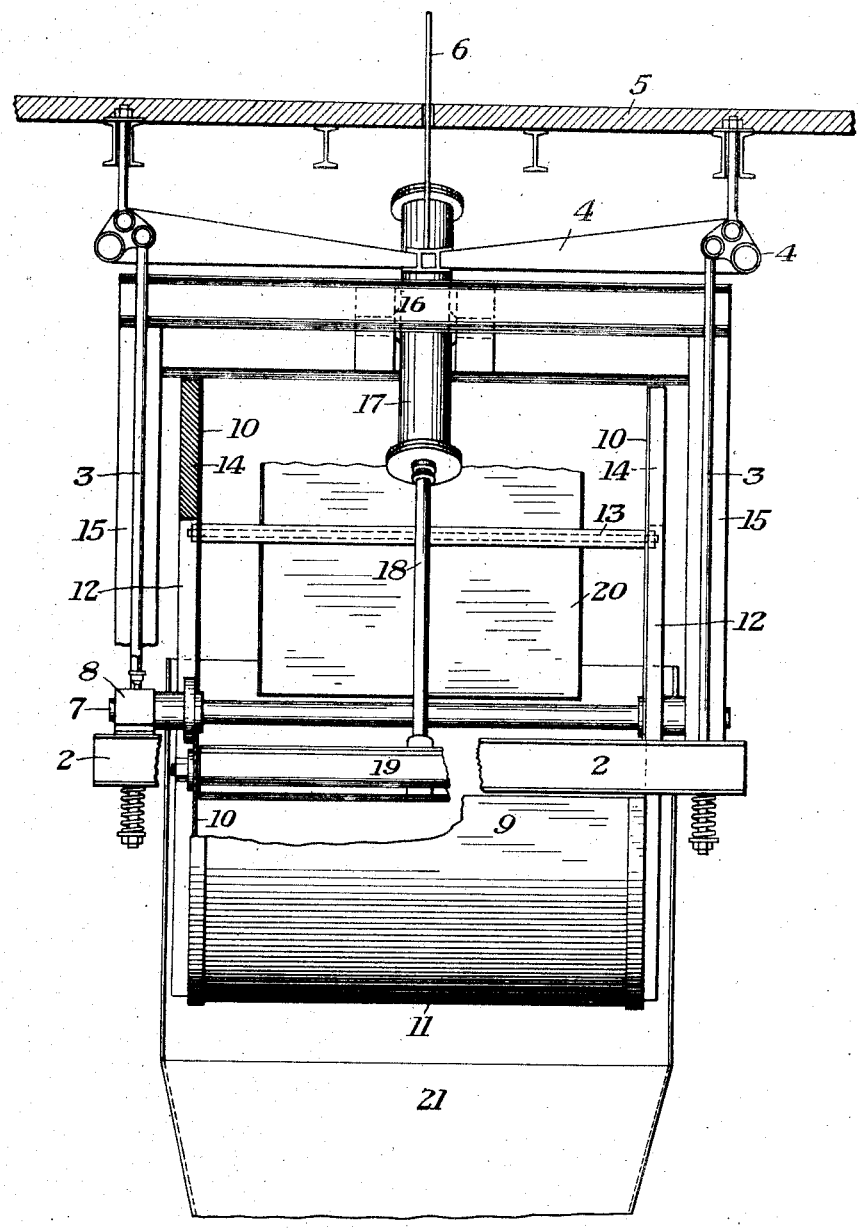
Figure 3 is a side elevation, partly broken away, illustrating the weigh pan in the position shown in Fig. 1.

From a comparison of Figures 1 and 2 of the drawings, it will be apparent that the power operated means is effective for moving the weigh pan approximately 90 degrees from a vertical to a substantially horizontal position. This insures the discharge of the entire content of the weigh pan each time it is operated.

The advantages of the present invention arise from the provision of an apparatus adapted to receive and accurately weigh any desired amount of material. Further advantages arise from the provision of means for positively moving such apparatus from its normal receiving position to its discharging position.

I claim:

1. In an apparatus for weighing coal, a frame supported by a scale element, a weigh pan having a fixed pivotal mounting on the frame, said pan having a closed bottom also an open top through which the coal to be weighed is delivered and through which the weighed coal is discharged, and actuating means for reversing at will the positions of the closed bottom and open top of the pan to place the top into either receiving or discharging position, substantially as described.

2. In an apparatus for weighing coal, a frame supported by a scale element, a weigh pan having a fixed pivotal mounting on the frame, said pan having a closed bottom also an open top through which the coal to be weighed is delivered and through which the weighed coal is discharged, and actuating means connected to the pan and to the frame above said pivotal mounting for reversing at will the positions of the closed bottom and open top of the pan to place the top into either receiving or discharging position, substantially as described.

3. In an apparatus for weighing coal, a frame supported by a scale element, a weigh pan pivotally mounted on the frame said pan having a closed bottom also an open top through which the coal to be weighed is delivered and through which the weighed coal is discharged, a counter weight connected to the frame located above the axis of the pan when the pan is in charging position and arranged to assist in the dumping movement of the pan, and means for reversing at will the positions of the closed bottom and open top of the pan to place the pan into either receiving or discharging position, substantially as described.

4. In an apparatus for weighing coal, a frame supported by a scale element, a weigh pan pivotally mounted on the frame said pan having a closed bottom also an open top through which coal to be weighed is delivered and through which weighed coal is discharged, a counter weight connected to the pan said counterweight being located above the axis of the pan and on each side of a vertical line passing through the said axis when the pan is in charging position to assist in dumping when the weight has passed said line during the dumping movement, and means for reversing at will the positions of the closed bottom and open top of the pan to place the top into either receiving or discharging position, substantially as described.

5. In an apparatus for weighing coal, a frame supported by a scale element, a weigh pan having a fixed pivotal mounting on the frame said pan having a closed bottom also an open top through which the coal to be weighed is delivered and through which the weighed coal is discharged, actuating means for reversing at will the positions of the closed bottom and open top of the pan to place the top into either receiving or discharging position, a coal delivery chute extending into the open top of the pan, and a coal receiving chute below the pan, substantially as described.

6. An apparatus for weighing coal comprising a weigh pan having an open top and a closed bottom, a frame surrounding the pan, pivotal connections between the pan and the frame, a scale element supporting the frame, a chute for delivering coal to the pan, a chute into which the coal is dumped from the pan, and means connected to the frame and the pan for oscillating the pan at will through at least 90° of movement, from receiving to dumping position, substantially as described.

7. An apparatus for weighing coal comprising a weigh pan having an open top and a closed bottom, a frame surrounding the pan, pivotal connections between the pan and the frame, a scale element supporting the frame, a chute for delivering coal to the pan, a chute into which the coal is dumped from the pan, means connected to the frame and the pan for oscillating the pan at will through at least 90° of movement, from receiving to dumping position and for retaining the pan in either of its shifted positions, and counterbalancing means for the pan normally positioned above said pivotal connections, substantially as described.

8. An apparatus for weighing coal comprising a weigh pan having an open top and a closed bottom, a frame surrounding the pan, pivotal connections between the pan and the frame, a scale element supporting the frame, a chute for delivering coal to the pan, a chute into which coal is dumped from the pan, a cylinder pivotally supported on the frame above the pan, and a piston in the cylinder connected to the pan for shifting the pan back and forth from receiving to dumping position, substantially as described.

9. Apparatus for receiving, weighing and discharging variable amounts of material, comprising a weigh pan, means for delivering material thereto, means for receiving material therefrom, means for weighing the material irrespective of its amount, and means for positively moving the weigh pan to effect discharge of all of the contents thereof at will, said means being located above the weigh pan.

10. Apparatus for receiving, weighing and discharging variable amounts of material, comprising a weigh pan, means for delivering material thereto, means for receiving material therefrom, means for weighing the material irrespective of its amount, and means for positively moving the weigh pan to effect discharge of all of the contents thereof at will, said means being located above the weigh pan intermediate the sides thereof.

11. Apparatus for receiving, weighing and discharging variable amounts of material, comprising a weigh pan, means for delivering material thereto, means for receiving material therefrom, a pivotal mounting for said weigh pan, counterbalancing means for said weigh pan above said pivotal mounting, means for weighing the material delivered to said weigh pan irrespective of its amount and means for positively moving the weigh pan to effect discharge of all of the contents thereof at will.

In testimony whereof I have hereunto set my hand.

J. PIERRE VOGEL.